United States Patent [19]
Nakako

[11] Patent Number: 5,083,352
[45] Date of Patent: Jan. 28, 1992

[54] TOOL CHANGING DEVICE FOR ROBOT

[75] Inventor: Toru Nakako, Kitakyushu, Japan

[73] Assignee: Kabushiki Kaisha Yaskawa Denki Seisakusho, Kitakyushu, Japan

[21] Appl. No.: 724,118

[22] Filed: Jul. 1, 1991

[30] Foreign Application Priority Data

Jul. 11, 1990 [JP] Japan .................................. 2-74171

[51] Int. Cl.⁵ .................................................. B23Q 3/10
[52] U.S. Cl. ........................................ 29/57; 414/729; 901/30
[58] Field of Search ............... 29/57, 568; 409/232, 409/234; 414/730, 729, 732; 403/328, 321; 901/29, 30, 41, 39, 49; 294/86.4, 88

[56] References Cited

U.S. PATENT DOCUMENTS

| | | | |
|---|---|---|---|
| 4,512,709 | 4/1985 | Hennekes | 414/729 |
| 4,580,941 | 4/1986 | Inaba et al. | 901/49 X |
| 4,627,785 | 12/1986 | Monforte | 901/39 X |
| 4,652,203 | 3/1987 | Nakashima | 901/30 |
| 4,664,588 | 5/1987 | Newell | 414/730 |
| 4,763,401 | 8/1988 | Marinoni | 29/568 |
| 4,784,421 | 11/1988 | Alvite | 294/86.4 |
| 4,852,242 | 8/1989 | Tella et al. | 29/568 |

FOREIGN PATENT DOCUMENTS 479674 8/1968 Japan .................................. 29/568

Primary Examiner—William Briggs
Attorney, Agent, or Firm—Beveridge, DeGrandi & Weilacher

[57] ABSTRACT

According to the present invention, there is provided a tool changing device for a robot comprising a piston reciprocating in a cylinder, a supporting block provided at the distal end of a piston rod, a pair of links interconnecting the supporting block to a pair of cramp members cramping a tool mounting plate.

Even in a case where the supply of a pressurized fluid is interrupted during the cramped state, and outside uncramping force is applied to the cramp members, a side surface of each cramp member abuts against a side surface of the supporting block, and the cramping members are thereby held in the cramping state.

6 Claims, 4 Drawing Sheets

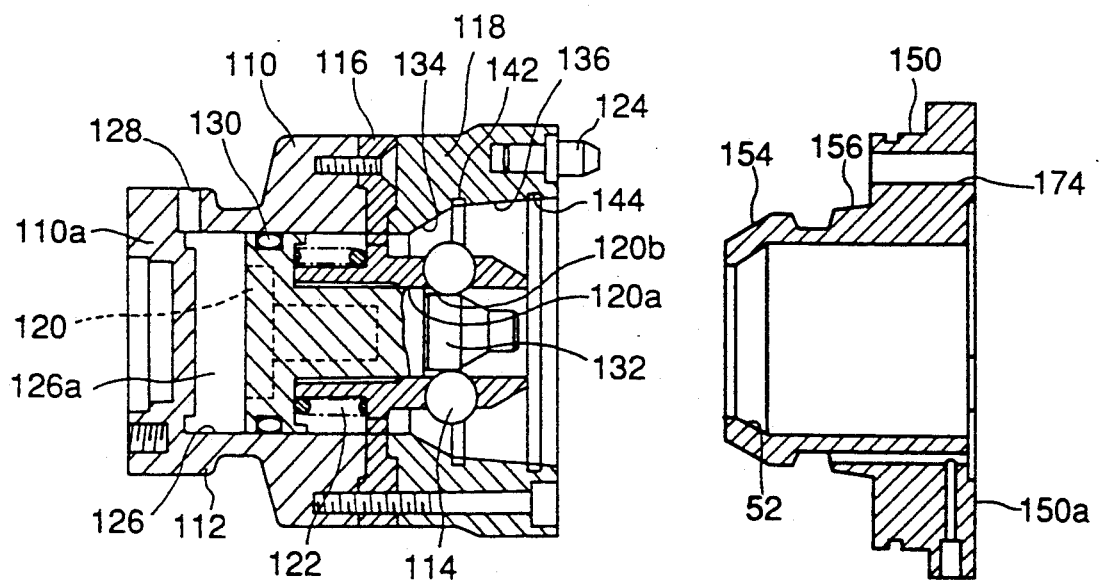
FIG. 6
PRIOR ART
FIG. 8
PRIOR ART
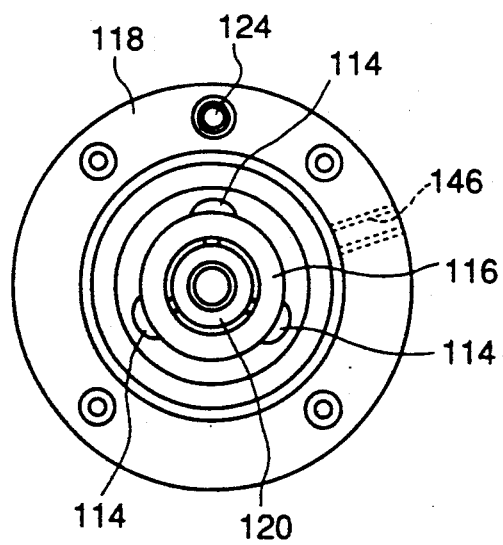
FIG. 7
PRIOR ART

TOOL CHANGING DEVICE FOR ROBOT

TECHNICAL FIELD OF APPLICATION

This invention relates to a tool changing device for a robot which permits to change tool attached to the wrist of an industrial robot.

BACKGROUND OF THE INVENTION

Heretofore known is a tool changing device secured to a wrist portion of an industrial robot, the device comprising a cylinder-formed main body, a cramp piston reciprocable within the main body, cramp balls displaced by the cramp piston, and an adapter supporting a cutting tool. When the cramp piston is operated, the cramp balls are displaced so as to cramp or release the adapter (refer to, for instance, Japanese Patent Laid-Open No. 186589/1983).

A typical construction of such a conventional device is illustrated in FIGS. 6, 7 and 8. In FIG. 6 showing a longitudinal sectional view, an end surface 110a of a changer main body 110 is secured to a wrist portion of an industrial robot (not shown). When a pressurized fluid is forced into a space 126 within a cylinder portion 112 of the main body 110 through an inlet/outlet port 128, a piston 120 is displaced rightward as viewed in FIG. 6. When the fluid is discharged, the piston 120 is retracted by the resilience force of a spring 122.

A cramp ball holder 116 is secured to the main body 110 by means of screws. Three cramp balls 114 are held by the ball holder 116 freely rotatably. An annular head 118 is further secured to the cramp ball holder 116 and the changer main body 110 by means of balls. Conical surfaces 134 and 136 of different tapers are formed inside of the annular head 118. Numeral 124 designates a positioning pin, and numerals 130 and 142 designate 0 rings that seal the cramp balls 114 and else. Through a hole 146 shown by dotted lines in FIG. 7, a pressurized fluid is introduced into an engaging portion between the main body 110 and a changer adapter 150 so as to control the operation of a hand (not shown) to be secured to a surface 150a of the adapter 150. As shown in FIG. 8, the changer adapter 150 has conical tapered surfaces 154 and 156. When the changer adapter 150 is engaged with the head 118, the conical surfaces 154 and 156 of the adapter 150 are brought into engagement with the conical surfaces 134 and 136 of the head 118, respectively.

Since the changer main body 110 and the changer adapter 150 are constructed as described above, the changer adapter 150 is firstly inserted into the forward opening end of the changer main body 110 with the positioning pin 124 inserted into an axially disposed hole 174 provided in the adapter 150 for aligning the positions of the main body 110 and the changer adapter 150, and engaging the conical surfaces 134 and 138 of the head 118 with the conical surfaces 154 and 156 of the adapter 150, respectively. Then, the piston 120 is advanced forward so as to push the cramp balls 114 onto an engaging surface 152 of the adapter 150, and to cramp hold the adapter 150 within the main body 110.

With the above described construction of the tool changing device, however, at the time of cramping tool, the cramp balls 114 are forced to contact with a straight portion 120a of the piston 120. As a result, the contacting parts of the cramp balls 114, piston 120 and the adapter 150 tend to wear after repetitive contacting and releasing operations, thus creating plays and causing erroneous positioning of the cutting tool. For avoiding the wear, it may be so constructed that the cramp balls contact with a tapered portion 120b of the piston 120 at the time where the adapter 150 is cramped. In this case, however, if the pressure inside of the cylinder is reduced by a trouble of the fluid source or a trouble in the fluid supplying hose, the piston 120 tends to be retracted by an outside force applied to the adapter 150, so that the cramp balls 114 are released from the adapter 150, and the cutting tool is thrown out of the tool changing device, thus causing a dangerous situation.

In a case where a compression spring is provided in the cylinder for preventing the retraction of the piston 120, the operational life of the spring becomes a problem.

An object of the present invention is to provide a tool changing device for a robot of high precision and high reliability, wherein even in a case where the supply of the pressurized fluid is interrupted because of a trouble, any possibility of the tool being thrown away due to an outside force can be substantially eliminated, and the play during the cramped time do not occur regardless of the long-years usage.

DISCLOSURE OF THE INVENTION

In order to achieve the above described object, there is provided a tool changing device of this invention wherein a cylinder portion is provided in a main body, a piston is reciprocated in the cylinder portion, a piston rod projects outwardly from an end wall of the cylinder portion, and a tool mounting plate is detachably secured to the end wall of the main body, the device comprising: at least a first pivot pin projecting radially outwardly from a supporting block secured to the distal end of the piston rod; a pair of lug members extending axially outwardly from the end wall; a pair of cramp members secured radially movably to the lug members; an engaging portion, engageable with the tool mounting plate, formed at a radially outer end of each cramp member; a second pivot pin projecting from each cramp member in parallel with the first pivot pin; and a pair of link members each having two holes, either one of which is elongated, said holes being engaged with said first pivot pin and the second pivot pin for coupling said cramp member to said piston rod.

Preferably, one of the two holes of each link member, adjacent to the supporting block is elongated to be engageable with the first pivot pin.

Preferably, each of the cramp members is formed into an L-shape and an end of the cramp member is pivotally connected with the lug member, with the other end thereof being formed into the engaging portion.

Preferably, a radially inward surface of each of the cramp members is projected radially inwardly such that when the piston is held in its cramping position, a radially outer end surface of the supporting block is held in the proximity of the radially inwardly projected surface of the cramp member.

Preferably, in a case where the piston is held in its cramping position, the link members are not held in a straight line manner but is held with a small angle formed therebetween, so that a sufficient margin is provided for a moving stroke of the piston.

In still another embodiment, a radially extending through hole is provided in each of the lug members, and the cramp members are constructed to be radially slidable in the through holes such that when the piston is brought into a cramping state, the radially outer engaging end portions of the cramp members are brought into engagement with the tool mounting -late.

BRIEF DESCRIPTION OF DRAWINGS

FIG. 6 is a longitudinal sectional view showing a main part of a conventional tool changing device;

FIG. 7 is a profile view taken from the right side of FIG. 6; and

FIG. 8 is a longitudinal sectional view of an adapter removable from the main part of the conventional tool changing device.

PREFERRED EMBODIMENTS OF THE INVENTION

Preferred embodiment of the present invention will now be described with reference to the accompanying drawings.

Figure 1:
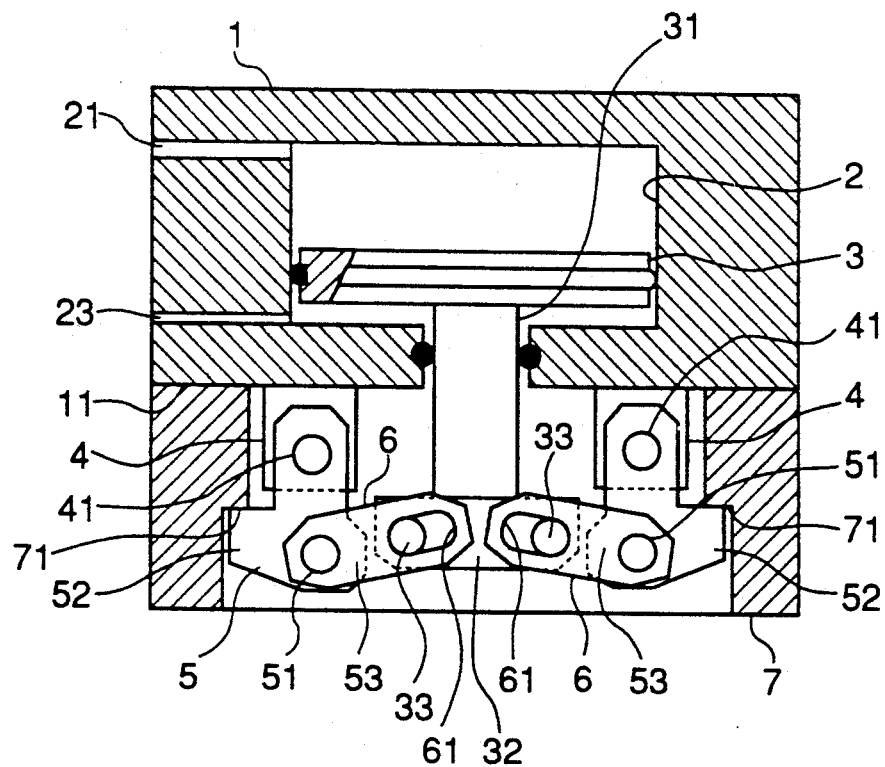
FIG. 1 is a longitudinal sectional view showing an embodiment of the present invention in a locked state.
Figure 2:
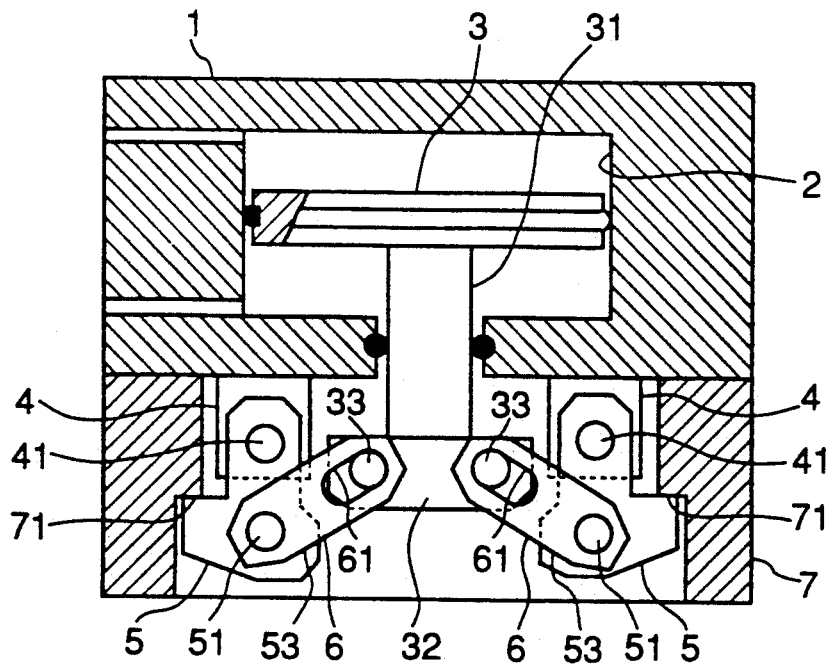
FIG. 2 is a sectional view similar to FIG. 1 showing the embodiment in a releasing state from the locking condition.
Figure 3:
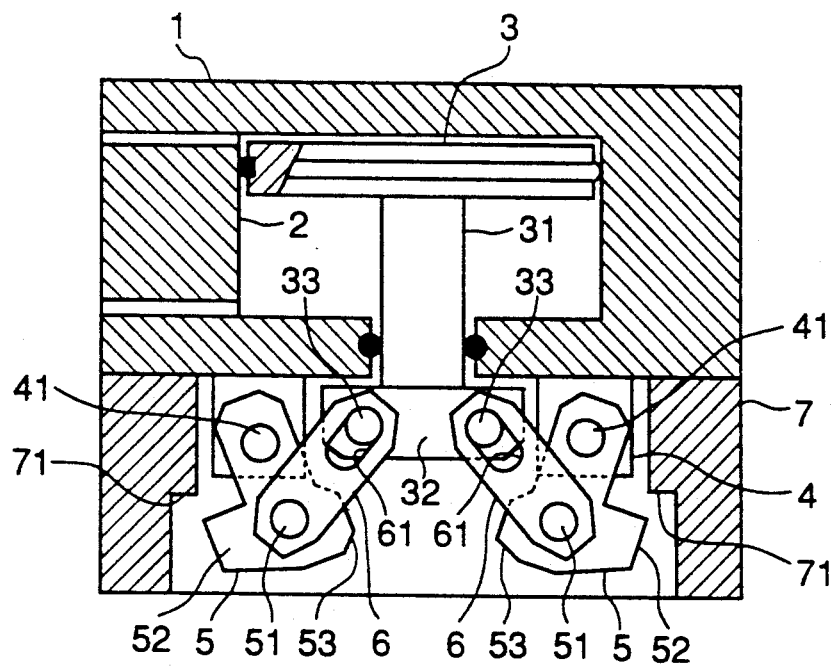
FIG. 3 is a sectional view similar to FIG. 1 showing the embodiment held in an uncramped state.

FIGS. 1 to 3 illustrate an embodiment of this invention, wherein a cylinder portion 2 is formed in a main body 1 of the tool changing device, and a piston 3 is provided reciprocatably in the cylinder portion 2. One side end of the cylinder portion 2 is closed, and an inlet-outlet port 21 for a pressurized fluid is provided adjacent to the closed end. A piston rod 31 extending from the piston projects outside of the cylinder portion 2 through an opening 22 formed in another side end wall 11.

Another inlet/outlet port 23 is provided adjacent to the another side end wall 11. A supporting block 32 is secured to the distal end of the piston rod 31, and first pivot pins 33 are implanted to project perpendicularly from the supporting block 32.

A pair of lugs 4 are secured to the outer surface of the end wall 11 at positions on the opposite sides of the piston rod.

A pair of L-shaped cramp members 5 are swingably connected with the lugs 4 through pivot pins 41. A pair of second pivot pins 51 are provided to extend from the central portions of the cramp members 5 in a relation parallel with the first pivot pins 33. The other ends of the L-shaped cramp members 5 are formed into engaging portions 52. A projecting portion 53 is formed on a side surface of each cramp member 5 that opposes the supporting block 32. A pair of link members 6 are extended between the pair of cramp members 5 and the supporting block 32. A hole formed at an end of each link member 6 engages with the second pivot pin 51 provided at the central portion of corresponding one of the cramp members 5, while an elongated hole 61 is formed at another end of each link member 6, so that the hole 61 is engageable with the first pivot pin 33 provided on the supporting block 32.

A tool mounting plate 7 on which a cutting tool is mounted is formed into a hollow cylindrical shape having a stepped portion 71 provided along an internal circumference. The inner diameter of a portion of the tool mounting plate 7 ranging from an end adjacent to the main body 1 to the stepped portion 71 is made smaller than that of the remaining portion of the tool mounting plate.

Accordingly, the engaging portion 52 at the outer end of each cramp member 5 is engageable with the stepped portion 71 of the tool mounting plate 7 so as to cramphold the tool mounting plate 7 to the end wall 11 of the main body 1.

FIG. 1 shows a state where the tool mounting plate 7 is cramped to the main body 1. In this state, the piston 3 is pushed downward as viewed in the drawing, the cramp members 5 are driven radially outwardly under the action of the piston rod 31, supporting block 32, pivot pins 33, links 6 and the pivot pins 51 so that the members 5 are rotated around the pivot pins 41 until the engaging portions 52 of the cramp members 5 are brought into engagement with the stepped portion 71. In this state, the gap between the side edge of the supporting block 32 and the projecting portion 53 of each cramp member 5 is made small, and the first pivot pins 33 are held in contact with the inner end edges of the elongated holes near the second pivot pins 51.

Even in a case where the supply of pressurized fluid is interrupted while the tool mounting plate 7 is cramped to the main body 1, and an outside force tending to release the tool mounting plate 7 from the main body 1 is applied so as to push the cramping members 5 toward the supporting block 32, a projecting portion 53 of the side surface of each cramp member 5 abuts against the side surface of the supporting block 32, and the rotation of the cramp member 5 around the pivot pin 41 is prohibited. Accordingly, the member 5 is held in the cramping state, and a force pushing back the piston 3 upward is not created.

Furthermore, it is so arranged that the pair of links 6 are not aligned in a straight line manner, but are held with a small angle formed therebetween during the cramp time, and therefore a sufficient margin is imparted to the stroke of the piston. Thus the possibility of the piston 3 being pushed up and unwanted play being produced can be eliminated even in a case where the members 5, links 6, tool mounting plate 7 and else are worn out.

FIG. 2 illustrates a state where the unlocking operation is initiated. Regardless of application of outside forces in whatever directions to the cramp members 5 held in the state of FIG. 1, it would be impossible to bring about the state shown in FIG. 2. However, only by pushing up the piston 3 due to the supply of the pressurized fluid, bringing the first pivot pin 33 into contact with the inner surface of the elongated hole far from the second pivot pin 51 is made possible. As a result, the link 6 is raised upward and the side surface of the supporting block 32 is separated from the side surface of the cramp member 5. Thus, the cramp member 5 is allowed to rotate around the pivot pin 41 until the engaging portion 52 of the cramp member 5 is disengaged from the stepped portion 71 of the tool mounting plate 7.

FIG. 3 illustrates a state where the piston 3 is further pushed up by the pressurized fluid, and the cramp member 5 is brought into a completely uncramped state.

Although a hole provided in each link 6 adjacent to the supporting block 32 has been elongated in the above described embodiment, it is apparent that another hole adjacent to the cramp member 5 may otherwise be elongated.

Figure 4:
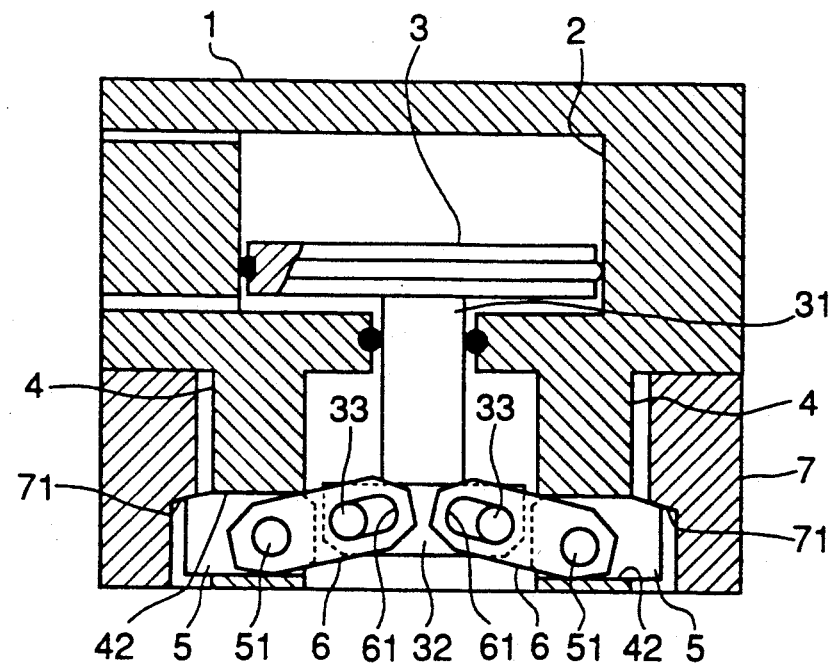
FIG. 4 is a longitudinal sectional view showing another embodiment of the invention.

FIG. 4 illustrates another embodiment wherein a through hole 42 is extended in each lug 4 in a direction perpendicular to the moving direction of the piston 3. Under the action of the link 6, the cramp member 5 is laterally displaced outwardly or inwardly within the through hole 42, so that the engaging portion 52 of the cramp member 5 is engaged with or disengaged from the stepped portion 71 of the tool mounting plate 7.

Figure 5:
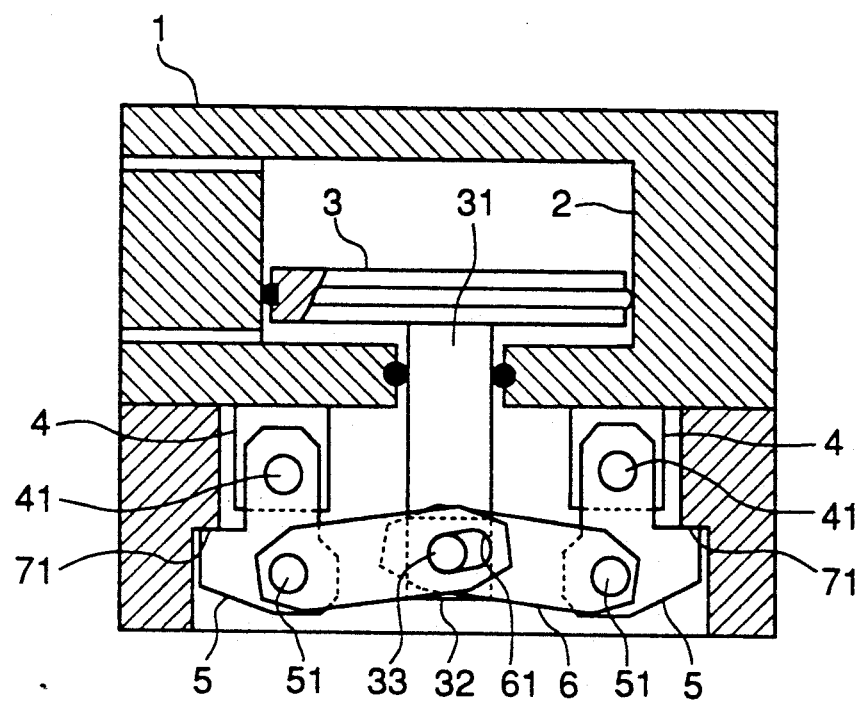
FIG. 5 is a longitudinal sectional view showing still another embodiment of the invention.

FIG. 5 illustrates still another embodiment wherein a single pivot pin 33 is provided to extend from a supporting block 32 secured to the distal end of the piston rod 31, and two elongated holes 61 formed in the pair of links 6 are brought into engagement with the single pivot pin 33.

ADVANTAGE OF THE INVENTION

The tool changing device for a robot according to the present invention is constructed such that in the cramped state, a side surface of the cramp member abuts against a side surface of the supporting block, and therefore any possibility of tool being thrown away can be substantially eliminated even in a case where the supply of a pressurized fluid is interrupted.

Furthermore, the pair of links are arranged not in a straight line manner but are held at a small angle during the cramped time, and therefore a sufficient margin is imparted to the stroke of the piston, the possibility of producing unwanted play due to worn-out members can be automatically eliminated, and a tool changing means of high reliability and high precision can be obtained.

WHAT IS CLAIMED IS:

1. A tool changing device for a robot wherein a cylinder portion is provided in a main body, a piston is reciprocated in the cylinder portion, a piston rod projects outwardly from an end wall of the cylinder portion, and a tool mounting plate is detachably secured to the end wall of the main body; said device comprising:
    at least a first pivot pin projecting radially outwardly from a supporting block secured to the distal end of the piston rod;
    a pair of lug members extending axially outwardly from said end wall;
    a pair of cramp members secured radially movably to said lug members;
    an engaging portion, engageable with the tool mounting plate, formed at a radially outer end of each cramp member;
    a second pivot pin projecting from each cramp member in parallel with said first pivot pin; and
    a pair of link members each having two holes, either one of which is elongated, said holes being engaged with said first pivot pin and said second pivot pin for coupling said cramp member to said piston rod.

2. The tool changing device according to claim 1 wherein one of the two holes formed in each link member, adjacent to the supporting block, is elongated to be engageable with said first pivot pin.

3. The tool changing device according to claim 1 wherein each of said cramp members is formed into an L-shape, and an end of the cramp member is pivotally connected with said lug member, while the other end thereof is formed into the engaging portion.

4. The tool changing device according to claim 1 wherein a radially inward surface of each of the cramp members is formed to project radially inwardly such that when the piston is held in a cramping position, a radially outer end surface of said supporting block is held in the proximity of the radially inwardly projecting surface of said cramp member.

5. The tool changing device according to claim 1 wherein in a case where said piston is held in a cramping position, said link members are not held in a straight line manner, but is held with a small angle formed therebetween, so that a sufficient margin is provided for a moving stroke of said piston.

6. The tool changing device according to claim 1 wherein a radially extending through hole is provided in each of said lug members, and said cramp members are constructed to be radially slidable in said through holes so that when said piston is brought into a cramping state, the radially outer engaging end portions of the cramp members are brought into engagement with said tool mounting plate.

* * * * *